(12) United States Patent
Shirai et al.

(10) Patent No.: US 6,301,003 B1
(45) Date of Patent: Oct. 9, 2001

(54) OPTICAL DISTANCE MEASURING APPARATUS SELECTIVELY ACTIVATING A MATRIX OF LIGHT SENSITIVE CELLS

(75) Inventors: Noriaki Shirai; Yoshiaki Hoashi, both of Kariya; Takeshi Matsui, Toyohashi, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/369,249

(22) Filed: Aug. 5, 1999

(30) Foreign Application Priority Data

Aug. 5, 1998 (JP) ................................................. 10-221694

(51) Int. Cl.[7] ................ B60T 7/16; G01C 3/08; G01B 11/26

(52) U.S. Cl. ................ 356/4.01; 180/169; 356/5.01; 356/141.1

(58) Field of Search .................. 356/4.01, 5.01, 356/141.1; 180/169

(56) References Cited

U.S. PATENT DOCUMENTS

| | | | |
|---|---|---|---|
| 5,760,886 | * 6/1998 | Miyazaki et al. | 356/5.01 |
| 5,864,391 | 1/1999 | Hosokawa et al. | 356/4.01 |
| 6,137,566 | * 10/2000 | Leonard et al. | 356/141.1 |

FOREIGN PATENT DOCUMENTS

| | | |
|---|---|---|
| 7-98381 | 4/1995 | (JP) . |
| 7-198850 | 8/1995 | (JP) . |

\* cited by examiner

*Primary Examiner*—Stephen C. Buczinski
(74) *Attorney, Agent, or Firm*—Pillsbury Winthrop LLP (57) ABSTRACT

An optical distance measuring apparatus is provided which is designed to transmit a laser beam in a cycle to scan a two-dimensional detection zone and to receive a return of the laser beam from a target through a light sensitive unit to determine data on the distance to the target. The light sensitive unit is made of a matrix of cells which are selectively activated in each scan cycle of the laser beam for minimizing optical interference with incoming light other than the return of the laser beam from the target in determining the data on the distance to the target.

5 Claims, 9 Drawing Sheets

DIRECTION OF 0°

(9, 1) + (10, 1) + (9, 2) + (10, 2)
$\wr$
(9, 5) + (10, 5) + (9, 6) + (10, 6)

FOUR CELLS ARE ACTIVATED SIMULTANEOUSLY

DIRECTION OF 10°

(15, 1) + ··· + (18, 1) + (15, 2) + ··· + (18, 2)
$\wr$
(15, 5) + ··· + (18, 5) + (15, 6) + ··· + (18, 6)

EIGHT CELLS ARE ACTIVATED SIMULTANEOUSLY

FIG. 7

→ HORIZONTAL DIRECTION

FIG. 8(b)

LIGHT IS FOCUSED ON THIS CURVE

OPTICAL DISTANCE MEASURING APPARATUS SELECTIVELY ACTIVATING A MATRIX OF LIGHT SENSITIVE CELLS

BACKGROUND OF THE INVENTION

1. Technical Field of the Invention

The present invention relates generally to an optical distance measuring apparatus designed to transmit a laser beam in a cycle and to receive a return of the laser beam from an object to determine the distance to the object, and more particularly to such a distance measuring apparatus having a matrix of light sensitive cells which are selectively activated in each scan cycle for minimizing optical interference with incoming light other than a return of a laser beam in determining data on the distance to an object.

2. Background Art

Automotive distance measuring systems are known in the art which are designed to transmit laser beams intermittently over an angular range embracing an automobile and receive a return of the laser beam to determine the amount of time required by the laser beam to travel to and return from a reflective object. It is advisable for such distance measuring systems to broaden an area scanned by laser beams in order to increase a detectable range.

The broadening of the scan area, however, requires increase in light sensitive area covered by light sensitive cells installed in a receiver, which may cause a laser beam outputted from a distance measuring system installed in an oncoming vehicle or another vehicle traveling on an adjacent lane to be received undesirably, thus resulting in errors in measuring the distance to a target object.

In order to avoid the above problem, Japanese Patent First Publication No. 7-98381 teaches a radar system which has an array of light sensitive cells in a receiver and activates some of the light sensitive cells selected as a function of a direction of emission of a laser beam, thereby decreasing an area receiving a return of the laser beam to minimize unwanted optical disturbances.

The determination of two-dimensional position of a target object, however, requires changing the direction of emission of laser beams two-dimensionally as well as arraying light sensitive cells in a matrix arrangement. The former requires a horizontal scan mechanism for scanning a laser beam in a width-wise direction of the vehicle and a vertical scan mechanism for scanning a laser beam in a height-wise direction of the vehicle, thus resulting in complexity of a structure of the radar system. For example, a scan system designed to emit laser beams over a given angular range through reflections on a mirror requires a mechanism for turning the mirror in two directions: vertical and horizontal directions, which also results in complexity of control for the movement of the mirror.

SUMMARY OF THE INVENTION

It is therefore a principal object of the present invention to avoid the disadvantages of the prior art.

It is another object of the present invention to provide a distance measuring system designed to minimize interference with optical disturbances such as incoming light other than a return of emitted light from a target to obtain data on a two-dimensional position of the target using a one-dimensional beam scan accurately.

According to one aspect of the invention, there is provided a distance measuring apparatus. The distance measuring apparatus comprises: (a) a laser scanner emitting a laser beam to scan a given object detection zone, in a cycle, defined by a first angular range and a second angular range substantially perpendicular to the first angular range, the laser beam having a cross section extending in a first angular direction so as to cover the first angular range of the object detection zone and being moved in a second angular direction so as to scan the second angular range in each scan cycle of the laser beam; (b) a light receiving unit receiving a return of the laser beam from a reflective object present in the object detection zone, the light receiving unit including a matrix of light sensitive cells defined by first arrays each of which extends in the second angular direction and which are disposed adjacent each other in the first angular direction for optically covering the first angular range of the object detection zone and second arrays each of which extends in the first angular direction and which are disposed adjacent each other in the second angular direction for optically covering the second angular range of the object detection zone, each of the light sensitive cells, when activated, converting the return of the laser beam falling thereon into an electric signal; (c) a time difference determining circuit responsive to the electric signal from the light receiving unit to determine a time difference between emission of the laser beam and reception of the return of the laser beam; (d) a distance determining circuit determining data on a distance to the reflective object based on the time difference determined by the time difference determining circuit; and (e) a cell activation selector selecting the light sensitive cells of the light receiving unit to be activated, the cell activation selector selectively activating the light sensitive cells of each of the second arrays in each scan cycle of the laser beam and also activating the light sensitive cells of each of the first arrays, in sequence, in the second angular direction in synchronism with scanning of the laser beam over the second angular range of the object detection zone in each scan cycle of the laser beam.

In the preferred mode of the invention, the cell activation selector activates the light sensitive cells of each of the second arrays, at least one in each scan cycle of the laser beam.

The cell activation selector selectively may activate the light sensitive cells of the light receiving unit in first and second cell selecting operation modes. In the first cell selecting operation mode, the light sensitive cells of each of the second arrays of the matrix are set operable selectively in each scan cycle of the laser beam. In the second cell selecting operation mode, the light sensitive cells of each of the first arrays of the matrix are switched to be operable, in sequence, in the second angular direction in synchronism with the scanning of the laser beam over the horizontal angular range of the object detection zone in each of the scan cycle of the laser beam. Each of the light sensitive elements is activated when operable simultaneously in the first and second cell selecting modes.

The cell activation selector may include switches each switching between an active condition and an inactive condition of one of the light sensitive cells of the light receiving unit.

A lens is further provided which converges incoming light at a light sensitive surface of the light sensitive unit defined by the matrix of the light sensitive cells. The cell activation selector selectively activates the light sensitive cells so that an area of the light sensitive surface optically covered by the light sensitive cells when activated is increased from a central portion toward a peripheral portion of the light sensitive surface.

The light sensitive cells of the light receiving unit have different sizes so that an area of the light sensitive surface of the light receiving unit optically covered by the light sensitive cells being activated is increased from the central portion toward the peripheral portion of the light sensitive surface.

The cell activation selector may selectively activate the light sensitive cells so that the number of the light sensitive cells activated is increased from the central portion toward the peripheral portion of the light sensitive surface of the light receiving unit.

The lens may be located so that a first distance between the lens and the central portion of the light sensitive surface of the light receiving unit may be shorter than a focal length of said lens, while a second distance between the lens and the peripheral portion of the light sensitive surface may be longer than the focal length.

An absolute value of a difference between the first distance and the focal length is equal to an absolute value of a difference between the second distance and the focal length.

When the distance measuring apparatus is employed in an automotive vehicle, the first angular direction is a height-wise direction of the vehicle, and the second angular direction is a width-wise direction of the vehicle.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
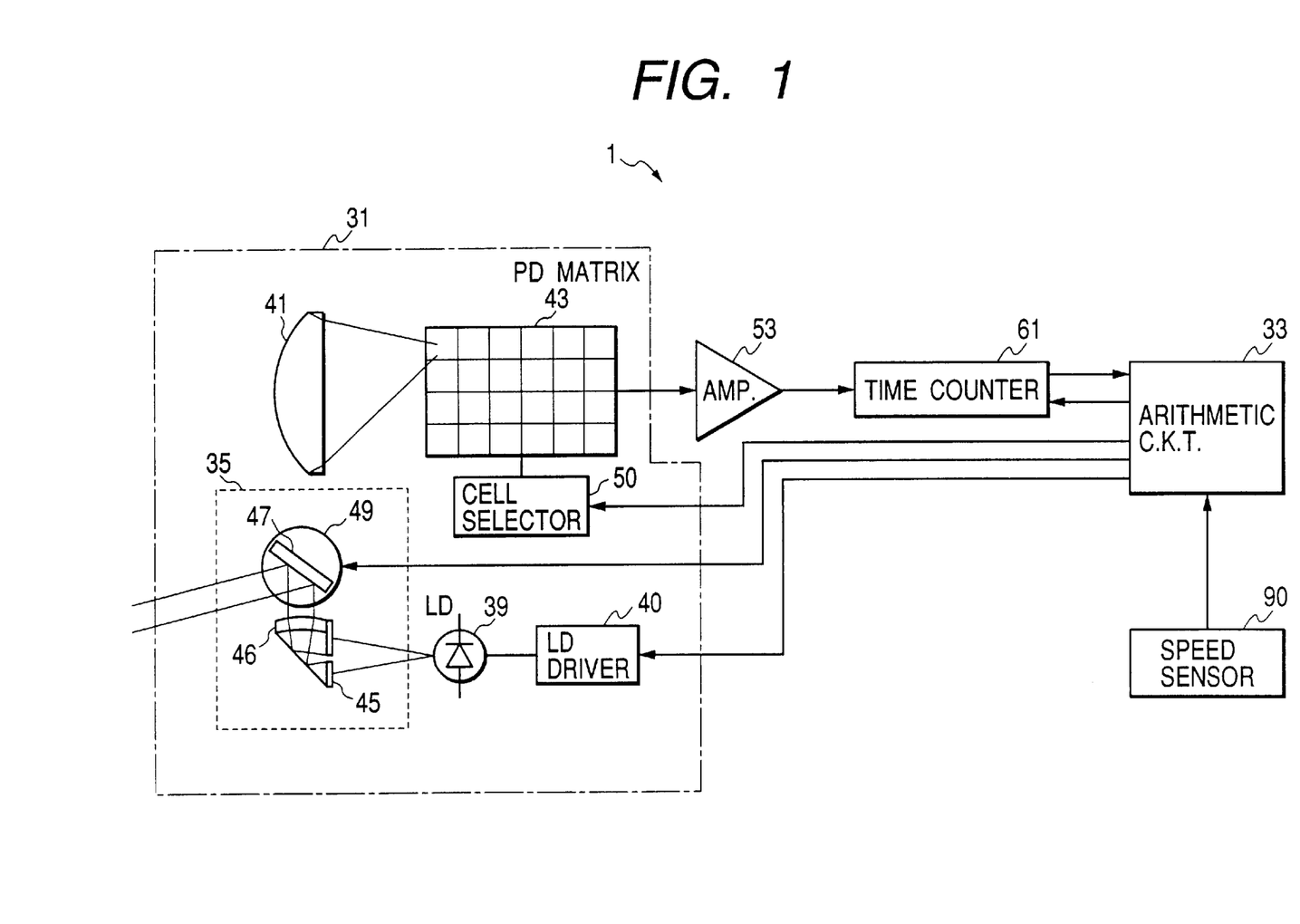
FIG. 1 is a block diagram which shows a distance measuring apparatus according to the present invention.

Referring now to the drawings, particularly to FIG. 1, there is shown a distance measuring apparatus 1 according to the present invention which may be employed in automotive anticollision radar systems or automotive tracking systems for controlling the speed of a vehicle so as to follow a preceding vehicle while maintaining a constant intervehicle distance.

In the following discussion, it is assumed that the distance measuring apparatus 1 is mounted in an automotive vehicle and determines data on at least one of the distance to and the angular position of an object present ahead of the vehicle.

The distance measuring apparatus 1 generally includes two major parts: a transceiver unit 31 and an arithmetic circuit 33.

The transceiver unit 31 includes a semiconductor laser diode 39 and a light sensitive unit 43. The laser diode 39 emits a laser beam in a cycle in the form of a pulse signal through a scan mechanism 35. The light sensitive unit 43 receives a return of the laser beam from a reflective object(s) (not shown) through a light-receiving lens 41 and provides a voltage signal changing in level as a function of the intensity of the received laser beam.

Figure 2A:
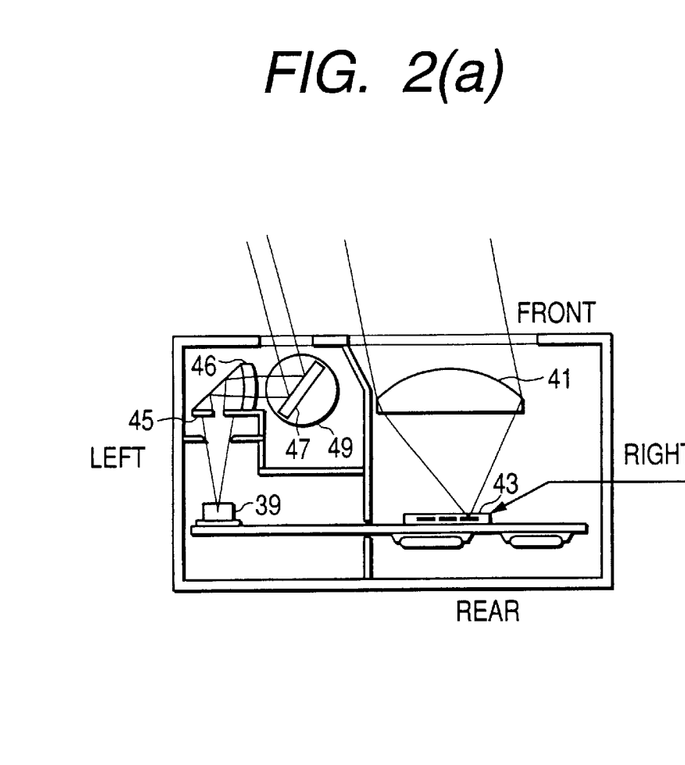
FIG. 2(a) is a cross sectional view which shows an optical system of a transceiver unit.

The laser diode 39 is connected to the arithmetic circuit 33 through a laser diode driver 40 and responsive to a diode control signal from the arithmetic circuit 33 to emit laser beams. The scan mechanism 35 consists of a diaphragm 45, a transmission lens 46, a mirror 47, and a scanner 49. The laser beam emitted from the laser diode 39 is shaped by the diaphragm 45 into a beam having a rectangular cross section which is further shaped by the transmission lens 46 into a long and narrow cross section in a vertical direction. The laser beam emerging from the transmission lens 46 is reflected on the mirror 47 swung by the scanner 49 horizontally to scan a frontal detection zone over a given angular range in a width-wise direction of the vehicle.

The frontal detection zone scanned by the scan mechanism 35 is a rectangular field defined by a vertical angle of 4° and a horizontal angle of 16°. The scanner 49 is designed to turn the mirror 47 to radiate the laser beams over a horizontal angular range of 16° (i.e., the width of the frontal detection zone) and not scan the laser beam in the vertical direction. Instead, the diaphragm 45 and the transmission lens 46, as described above, shape the laser beam emitted from the laser diode 39 into a beam having a cross section extending vertically so as to cover a vertical angular range of 4° (i.e., the height of the frontal detection zone).

The light sensitive unit 43 consists of a matrix of light sensitive cells made of photodiodes which provide voltage outputs changing in response to varying intensity of light falling thereon and which are arrayed so that they may receive returns of laser beams from the frontal detection zone of 4°×16°.

Figure 2B:
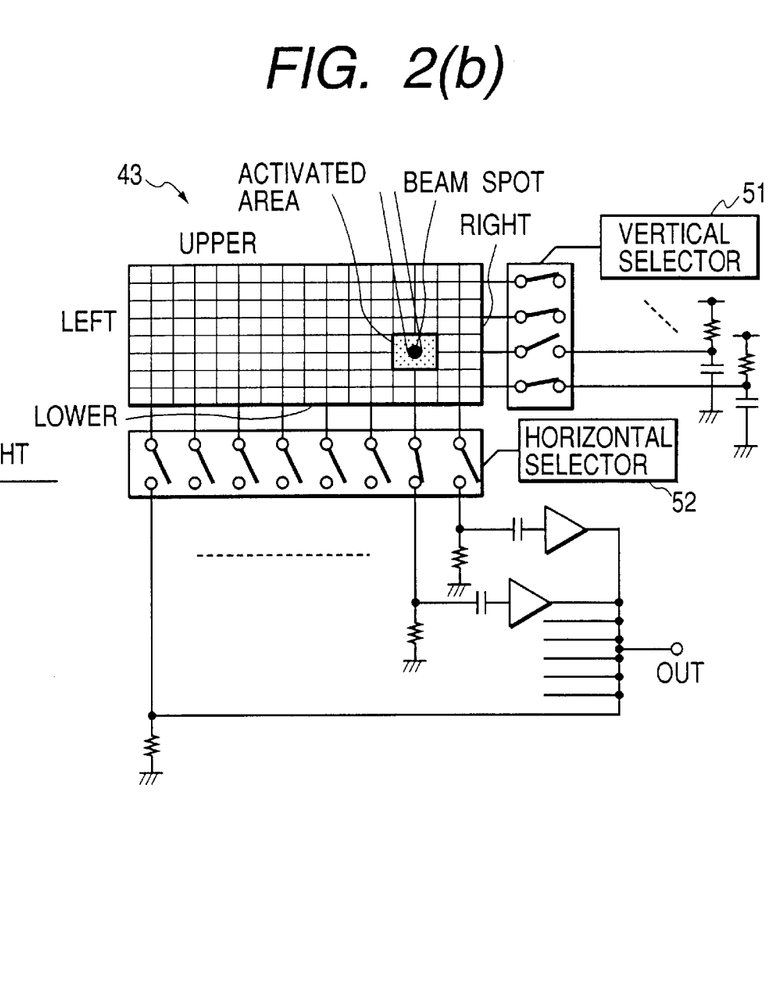
FIG. 2(b) is a diagram which shows circuit structures of a cell selecting circuit and a light sensitive unit.

The transceiver unit 31 also includes a cell selecting circuit 50. The cell selecting circuit 50 includes, as shown in FIG. 2(b), a vertical cell selector 51 and a horizontal cell selector 52. The vertical cell selector 51 includes, as clearly shown in the drawing, switches each connected to one of horizontal arrays of the cells of the light sensitive unit 43 (i.e., one of rows of the matrix). Similarly, the horizontal cell selector 52 includes switches each connected to one of vertical arrays of the cells (i.e., one of columns of the matrix). The vertical cell selector 51 sets one or some of the cells of each of the vertical arrays operable each time one laser beam is emitted. The horizontal cell selector 52 sets one or some of the cells of each of the horizontal arrays operable, in sequence, from right to left or vice versa in each scan cycle of the laser beam. Each of the cells becomes activated only when set operable both by the vertical cell selector 51 and by the horizontal cell selector 52. In practice, the cell selecting circuit 50 activates, as clearly shown in FIG. 2(b), only the cells which connect both with the switches opened by the vertical cell selector 51 and with the switches closed by the horizontal cell selector 52.

A voltage output from the light sensitive unit 43 is, as shown in FIG. 1, inputted to a time counter 61 through an amplifier 53 as a stop pulse signal PB, as will be described later in detail. The voltage output may be amplified by an STC (Sensitive Time Control) circuit (not shown) to a given level. Usually, the intensity of a received signal (i.e., the input to the light sensitive unit 43) is inversely proportional to the distance to a target to the fourth power, therefore, if an object having a high reflectivity such as a reflector is present at short range, it will cause the intensity of a received signal to be increased. The STC circuit is effective in compensating for the increase in intensity of the received signal.

To time counter 61, the diode control signal provided from the arithmetic circuit 33 to the laser diode driver 40 is also inputted as a start pulse signal PA. The time counter 61 codes a phase difference (i.e., an input time difference) between the pulse signals PA and PB into a binary digital signal and outputs it to the arithmetic circuit 33. The time counter 61 is designed to convert micro-time intervals into numerical quantities so that even if there are a plurality of received light signals relative to a single short of emitted laser beams, a time difference of each of the received light signals may be determined.

The time counter 61 may be provided with an odd-stage ring oscillator in which an odd number of inverter gate delay circuits inverting input signal levels are connected in a ring form, and a pulse edge is circulated around the connected delay circuits. For example, IEICE TRANS. ELECTRON vol. E76-C. no. 12, pp.1774–1779, published on December 1993 discloses a suitable ring gate delay circuit system.

The phase difference between the start pulse signal PA and the stop pulse signal PB may be determined in the following manner. In response to input of the start pulse signal PA, a pulse edge is circulated around the ring oscillator, while in response to input of the stop pulse signal PB, it is determined which of the inverter delay circuits the pulse edge provided upon the input of the start pulse signal PA reaches for determining the phase difference between the two pulse signals PA and PB.

In general, when a digital circuit is used to measure a time, clock cycles are considered as representing the resolution, but the time counter 61, as mentioned above, is designed to convert a time interval (i.e., the phase difference between the two pulse signals PA and PB) into a numerical quantity with the degree of resolution much finer than that provided by a clock circuit. Thus, even if there are a plurality of received light signals for a single shot of laser beam, that is, if there are the two stop pulse signals PB for the one start pulse signal PA, a phase difference of each of the received light signals may be determined. In the following discussion, this phase difference detection will be referred to as "multi-lap detection". Distance data derived by the multi-lap detection will be referred to as "multi-lap distance data". U.S. Pat. No. 5,627,511 to Takagi et al., assigned to the same assignee as that of this application teaches such multi-lap detection, disclosure of which is incorporated herein by reference.

The arithmetic circuit 33 determines both the distance to an object lying within the detection zone and the angular direction thereof based on the phase difference (i.e., the time difference) derived by the time counter 61 and an angle of the mirror 47. The arithmetic circuit 33 receives a vehicle speed signal derived by a vehicle speed sensor 90 such as a speedometer.

An operation of the distance measuring apparatus 1 will be discussed below.

When the distance measuring apparatus 1 is turned on, the arithmetic circuit 33 outputs the diode control signal to the laser diode driver 40 to activate the laser diode 39. The laser diode 39 emits a laser beam in a cycle through the mirror 47 over the detection zone in front of the vehicle. When a reflective object is present in the detection zone, it will cause the laser beam to be reflected on the object and received by the light sensitive unit 43 through the light-receiving lens 41. The light sensitive unit 43 outputs a voltage signal as a function of the intensity of the received laser beam to the time counter 61 through the amplifier 53. The time counter 61 finds, as described above, a time difference between emission of the laser beam and reception of a return of the laser beam and outputs it to the arithmetic circuit 33. If the light sensitive unit 43 receives a plurality of returns from the object for a single laser beam, the time counter 61, as described above, finds the time difference of each return and outputs it to the arithmetic circuit 33. The arithmetic circuit 33 determines distance data based on the time difference determined by the time counter 61 and stores it in a RAM (not shown).

Usually, the time difference determined by the time counter 61 contains time lags between reception of light in the light sensitive unit 43 and output of a corresponding voltage signal and between input to and output from the amplifier 53. The arithmetic circuit 33, thus, corrects the time difference determined by the time counter 61 to compensate for such time lags and determines the distance to a target accurately based on the corrected time difference and the speed of light. The arithmetic circuit 33 may alternatively output the corrected time difference as a distance data without determining the distance to the target because the corrected time difference may be used as data proportional to the distance to the target accurately in, for example, automotive anticollision radar systems or automotive tracking systems.

Figure 3A:
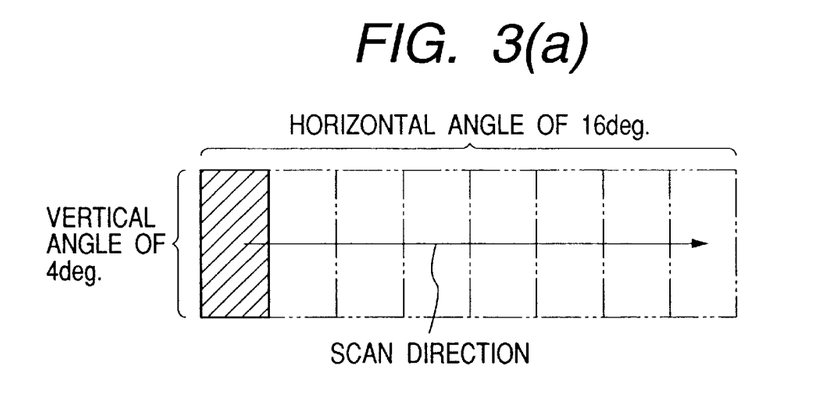
FIG. 3(a) is an illustration which shows a cross section of a laser beam scanning an object detection range horizontally.
Figure 3B:
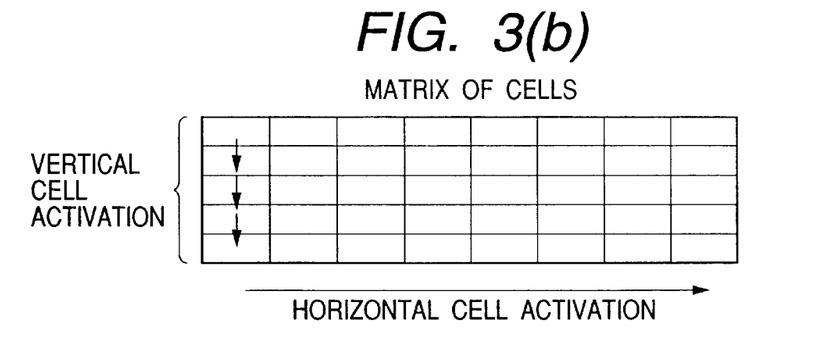
FIG. 3(b) is an illustration which shows a sequence of cell activating operations.

The distance measuring apparatus 1 is designed to emit a plurality of laser beams in sequence over the scan angular range (i.e., the detection zone of 16°×4°, as shown in FIG. 3(a)) or emit a given number of laser beams in each of different angular directions preselected, for example, at regular intervals in the scan angular range and switches, as described above, the cells of the light sensitive unit 43 to be activated in each emission of the laser beams. If the light sensitive unit 43 is constructed of, as shown in FIG. 3(*b*), four horizontal arrays of cells and eight vertical arrays of cells, the cell selecting circuit 50 activates, for example, as shown in FIG. 3(*c*), the uppermost cell of each of the vertical arrays when the first of the laser beams is emitted. Similarly, when the second of the laser beams is emitted, the cell selecting circuit 50 activates the second cell of each of the vertical arrays. When the fourth of the laser beams is emitted, the cell selecting circuit 50 activates, as shown in FIG. 3(*d*), the lowermost cell of each of the vertical arrays. The order in which the cells of each of the vertical arrays are activated is not limited to the above. For example, the lowermost, uppermost, and middle cells of each of the vertical arrays may be activated in sequence as needed.

Figure 3C:
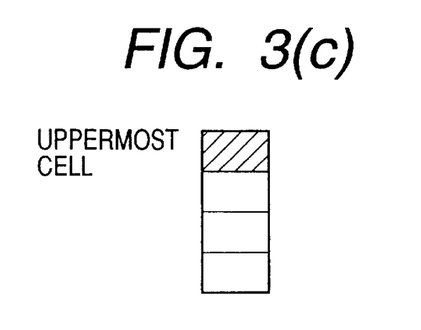
FIG. 3(c) shows one of vertical arrays of light sensitive cells when an uppermost one is activated.
Figure 3D:
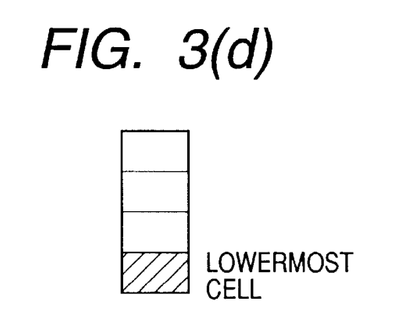
FIG. 3(d) shows one of vertical arrays of light sensitive cells when a lowermost one is activated.

When the uppermost cells of the vertical arrays are activated, it is possible to detect a target present in a lower portion of the detection zone. Conversely, when the lowermost cells are activated, it is possible to detect a target present in an upper portion of the detection zone. This is because light traveling from the upper portion of the detection zone passes through the light-receiving lens 41 and falls on a lower portion of the light sensitive unit 43, while light traveling from the lower portion of the detection zone passes through the light-receiving lens 41 and falls on an upper portion of the light sensitive unit 43.

Therefore, data on a vertical position of a target is obtained easily by specifying the activated cells in the vertical arrays of the light sensitive unit 43 when a return of a laser beam from the target enters the light sensitive unit 43. Data on a horizontal position of the target is obtained in the following manner.

Figure 4A:
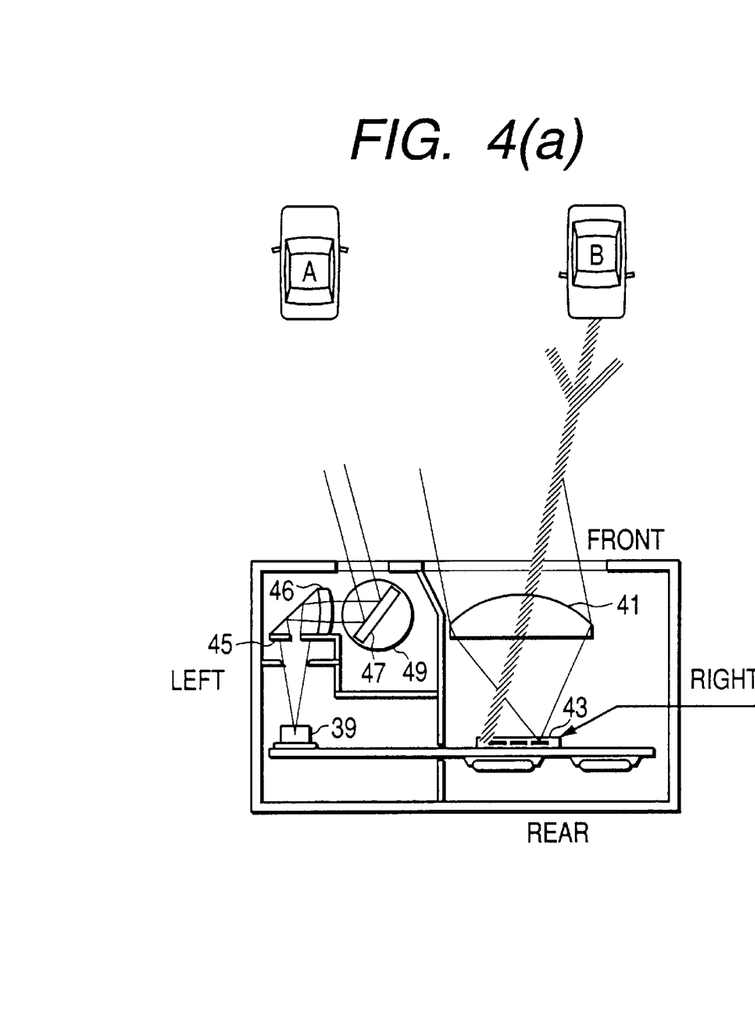
FIG. 4(a) is a cross sectional view which shows a case where light emitted from an oncoming vehicle B falls on a light sensitive unit as an optical disturbance.
Figure 4B:
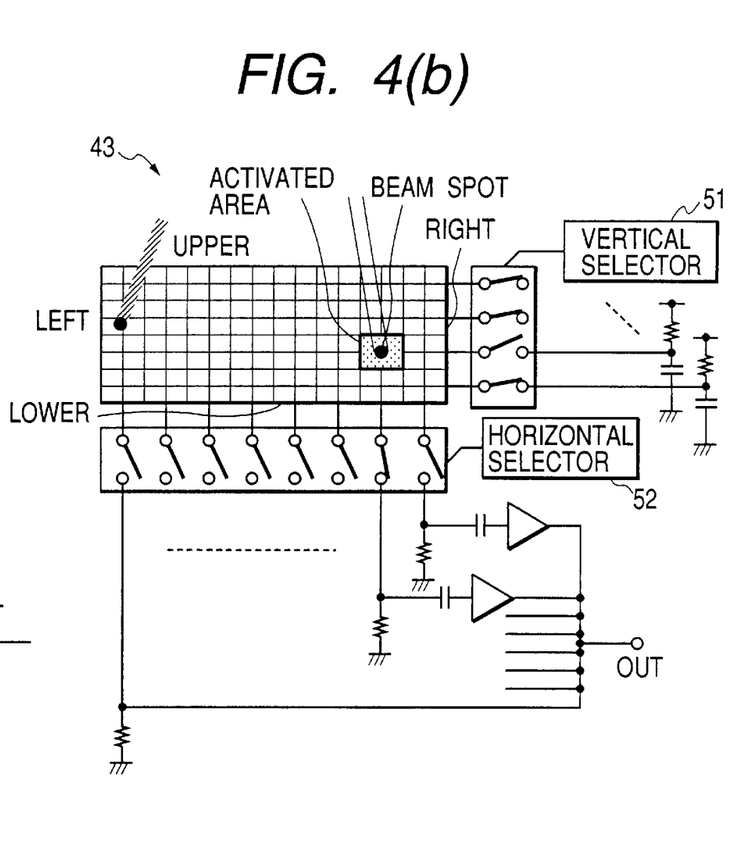
FIG. 4(b) shows locations of spots of lights on a light sensitive unit which are returned from a target vehicle A and emitted from an oncoming vehicle B shown in FIG. 4(a)

The cell selecting circuit 50 activates only one or some of the cells of each of the four horizontal arrays in the light sensitive unit 43 which are selected, as discussed below in detail, in synchronism with angular movement of the mirror 47 in each scan cycle. Assume for instance that a target vehicle A, as shown in FIG. 4(*a*), is preceding a system vehicle equipped with the distance measuring apparatus 1 on a left side of a road and at the same time a vehicle B is approaching the system vehicle on a right side of the road (e.g., an opposite lane) as causing an optical disturbance and that the frontal detection zone is scanned by a laser beam from left to right. Light incoming from the left (i.e., the target vehicle A) passes through the light-receiving lens 41 and falls, as shown in FIG. 4(*b*), on a right portion of a light sensitive area covered optically by the matrix of cells of the light sensitive unit 43, while light incoming from the right (i.e., the vehicle B) passes through the light-receiving lens 41 and falls on a left portion of the light sensitive area. The arithmetic circuit 33, therefore, controls the cell selecting circuit 50 so as to activate the vertical arrays of cells in the light sensitive unit 43, in sequence, from right to left in each scan cycle in synchronism with the angular movement of the mirror 47. In other words, in the early part of each scan cycle, that is, when the mirror 47 is oriented to the left to emit a laser beam in the left direction, a return of the laser beam from the vehicle A is expected to fall on the right portion of the light sensitive area of the light sensitive unit 43, and the cell selecting circuit 50 activates some of the vertical arrays of cells arranged on the right side in the light sensitive unit 43 in sequence, while in the late part of each scan cycle, that is, when the mirror 4 is oriented to the right to emit a laser beam in the right direction, a return of the laser beam from the vehicle B is expected to fall on the left portion of the light sensitive unit 43, and the cell selecting circuit 50 activates some of the vertical arrays of cells arranged on the left side in the light sensitive unit 43 in sequence. Therefore, in the early part of each scan cycle, the light sensitive unit 43 receives a return of the laser beam from the target vehicle A without interference with any optical noise from the right direction (i.e., light traveling from the vehicle B), so that the distance to and the angular position of the target can be measured accurately.

It is, however, advisable that the selection of the cells of the light sensitive unit 43 to be activated be achieved by taking the light-converging function of the light-receiving lens 41, as described below, into account.

Figure 5A:
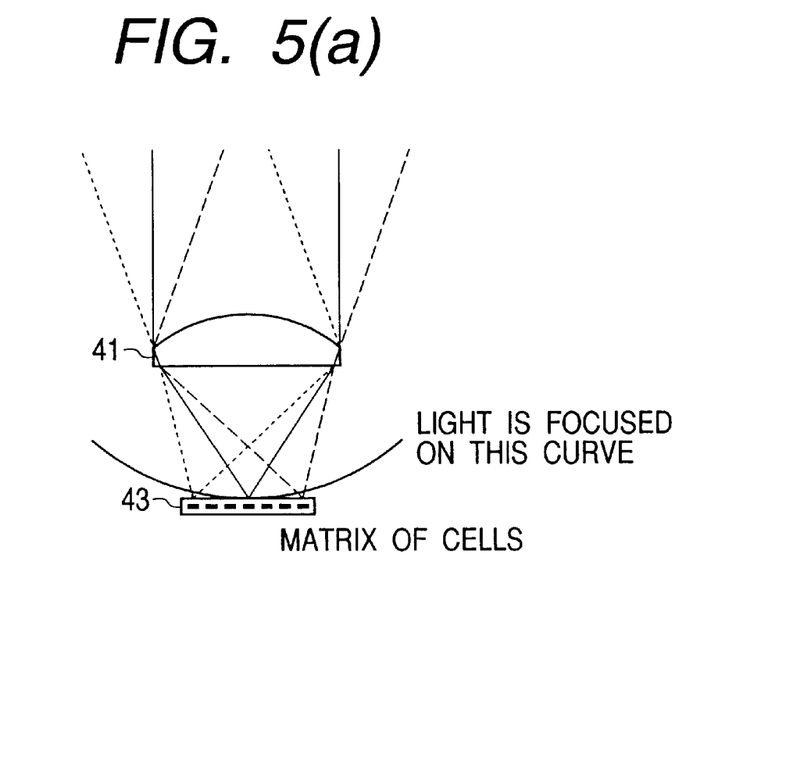
FIG. 5(a) shows an optical relation between a light-receiving lens and a light sensitive unit.
Figure 5B:
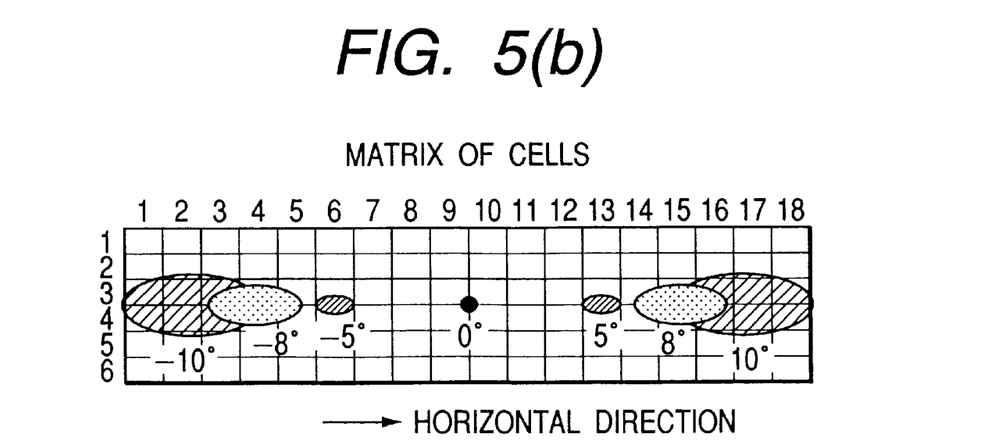
FIG. 5(b) shows the size of spots of light falling on a central area and side areas of a light sensitive unit.

The light-receiving lens 41 is designed to converge the incoming light at the light sensitive unit 43. When the light-receiving lens 41 is, as shown in FIG. 5(*a*), so located that the focal point thereof is defined on the center of the light sensitive unit 43, it will cause a spot of light converged on the light sensitive unit 43, as shown in FIG. 5(*b*), to increase in size and change in shape into oval as moving from the center to the sides. In view of this phenomenon, three measures, as discussed below, may be taken.

Figure 6:
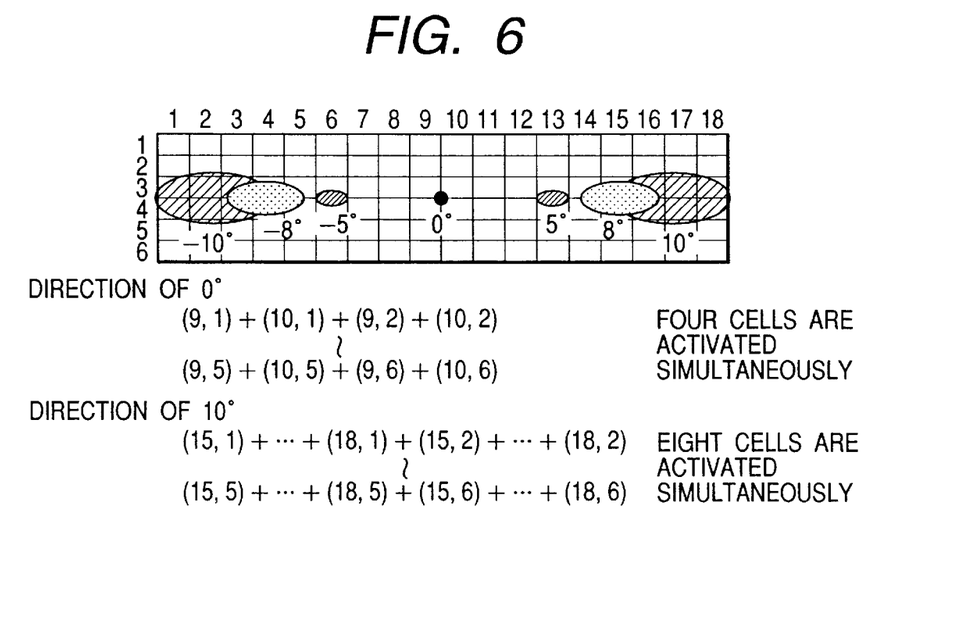
FIG. 6 shows groups of light sensitive elements to be activated in each scan cycle of a laser beam.

(1) An area of the light sensitive surface of the light sensitive unit 43 optically covered by the cells which are activated by the cell selecting circuit 50 is increased as approaching the sides of the light sensitive unit 43. For example, at a time when a return of a laser beam from an object present in the detection zone is expected to fall on the light sensitive unit 43 at an incidence angle of 0° in a horizontal component thereof, (i.e., when the mirror 47 is oriented frontward) the arithmetic circuit 33 controls the cell selecting circuit 50 so as to select or activate adjacent four of the cells occupying a square area of the light sensitive surface simultaneously. Specifically, if the light sensitive unit 43 is, as shown in FIG. 6, formed with a matrix of 18 horizontal cells×6 vertical cells, and if x and y coordinates of each cell is defined as (m, n), five groups, as shown below, each consisting of four adjacent cells are activated in sequence in each sequence of five emissions of laser beams when the mirror 47 is oriented frontward.

| | |
|---|---|
| 1st beam emission | (9, 1), (10, 1), (9, 2), (10, 2) |
| 2nd beam emission | (9, 2), (10, 2), (9, 3), (10, 3) |
| 3rd beam emission | (9, 3), (10, 3), (9, 4), (10, 4) |
| 4th beam emission | (9, 4), (10, 4), (9, 5), (10, 5) |
| 5th beam emission | (9, 5), (10, 5), (9, 6), (10, 6) |

Similarly, for example, when a return of a laser beam from an object present in the detection zone is expected to fall on the light sensitive unit 43 at an incidence angle of −10° in a horizontal component thereof, the arithmetic circuit 33 controls the cell selecting circuit 50 so as to activate five groups, as shown below, each consisting of eight adjacent cells in sequence in each sequence of five emissions of laser beams.

| | |
|---|---|
| 1st beam emission | (1, 1), (2, 1), (3, 1), (4, 1), (1, 2), (2, 2), (3, 2), (4, 2) |
| 2nd beam emission | (1, 2), (2, 2), (3, 2), (4, 2), (1, 3), (2, 3), (3, 3), (4, 3) |
| 3rd beam emission | (1, 3), (2, 3), (3, 3), (4, 3), (1, 4), (2, 4), (3, 4), (4, 4) |

| | |
|---|---|
| 4th beam emission | (1, 4), (2, 4), (3, 4), (4, 4), (1, 5), (2, 5), (3, 5), (4, 5) |
| 5th beam emission | (1, 5), (2, 5), (3, 5), (4, 5), (1, 6), (2, 6), (3, 6), (4, 6) |

The above selection of the cells of the light sensitive unit 43 to be activated compensates for a change in size of the spot of light falling on the light sensitive unit 43 with a change in incidence angle of the light.

Figure 7:
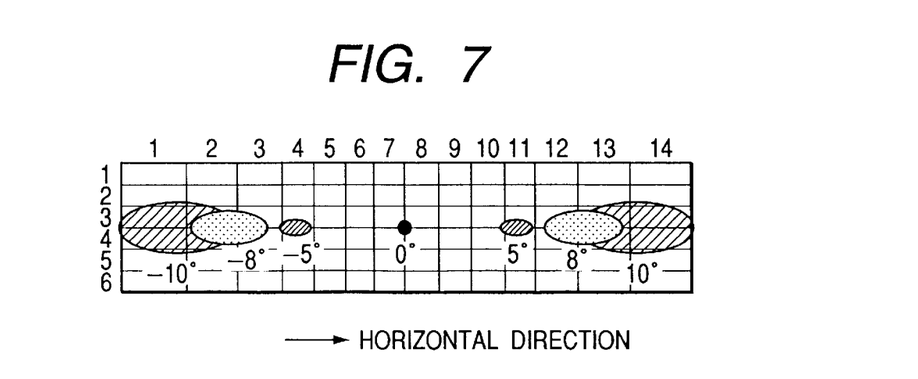
FIG. 7 shows a modification of a light sensitive unit which consists of light sensitive element different in size in a horizontal direction.

(2) The size of the cells disposed on the side areas of the light sensitive unit 43 is increased as compared with that of the cells disposed near the center of the light sensitive unit 43. Specifically, as shown in FIG. 7, in the side areas of the light sensitive unit 43, cells having the size enough for a square matrix of four ones to optically cover most of the oval spot of light falling on the light sensitive unit 43 are installed, while in the central area of the light sensitive unit 43, smaller cells are installed. This allows four of the cells forming a square matrix to be activated at the same time so that they will also cover most of the oval spot of light falling on the side areas of the light sensitive unit 43 at an incidence angle of ±10° which allows the switches of the vertical cell selector 51 and the horizontal cell selector 52 to be decreased, thereby resulting in simplicity of a logic circuit used in controlling the selectors 51 and 52 and decreases in pin and wire in a case where the cell selecting circuit 50 is made of ICs.

In FIG. 7, the size of the cells in the side areas of the light sensitive unit 43 is increased horizontally, but it may also be increased vertically. Further, in either of ranges of 0°, ±5°, ±8°, and ±10°, the square matrixes of four cells are activated in sequence in response to outputs of the laser beams, but in the range of ±10°, matrixes of six cells may be activated in sequence to cover the whole of the oval spot of light falling on the side areas of the light sensitive unit 43.

Figure 8A:
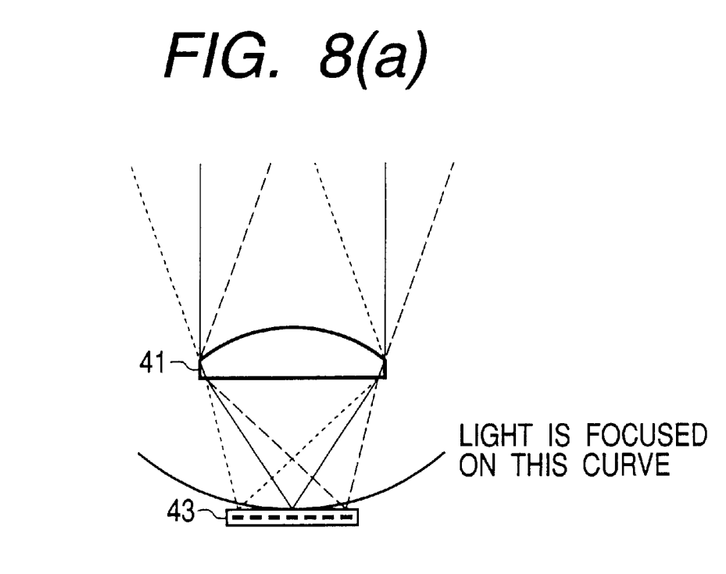
FIG. 8(a) shows the relation between a light-receiving lens and a light sensitive unit when the focal point of the light-receiving lens is defined on the center of the light sensitive unit.
Figure 8B:
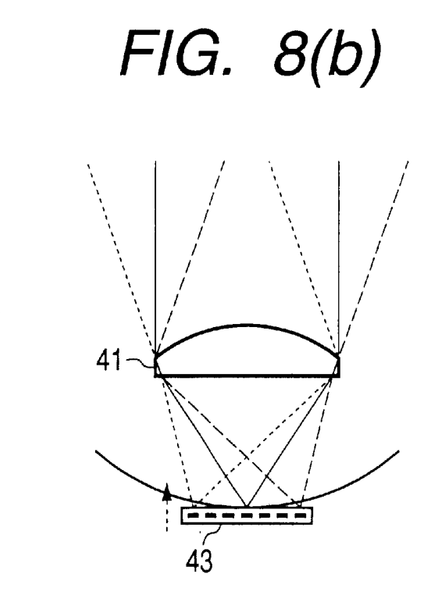
FIG. 8(b) shows the relation between a light-receiving lens and a light sensitive unit when the distance between the light-receiving lens and the center of the light sensitive unit is decreased below the focal length of the light-receiving lens.
Figure 9:
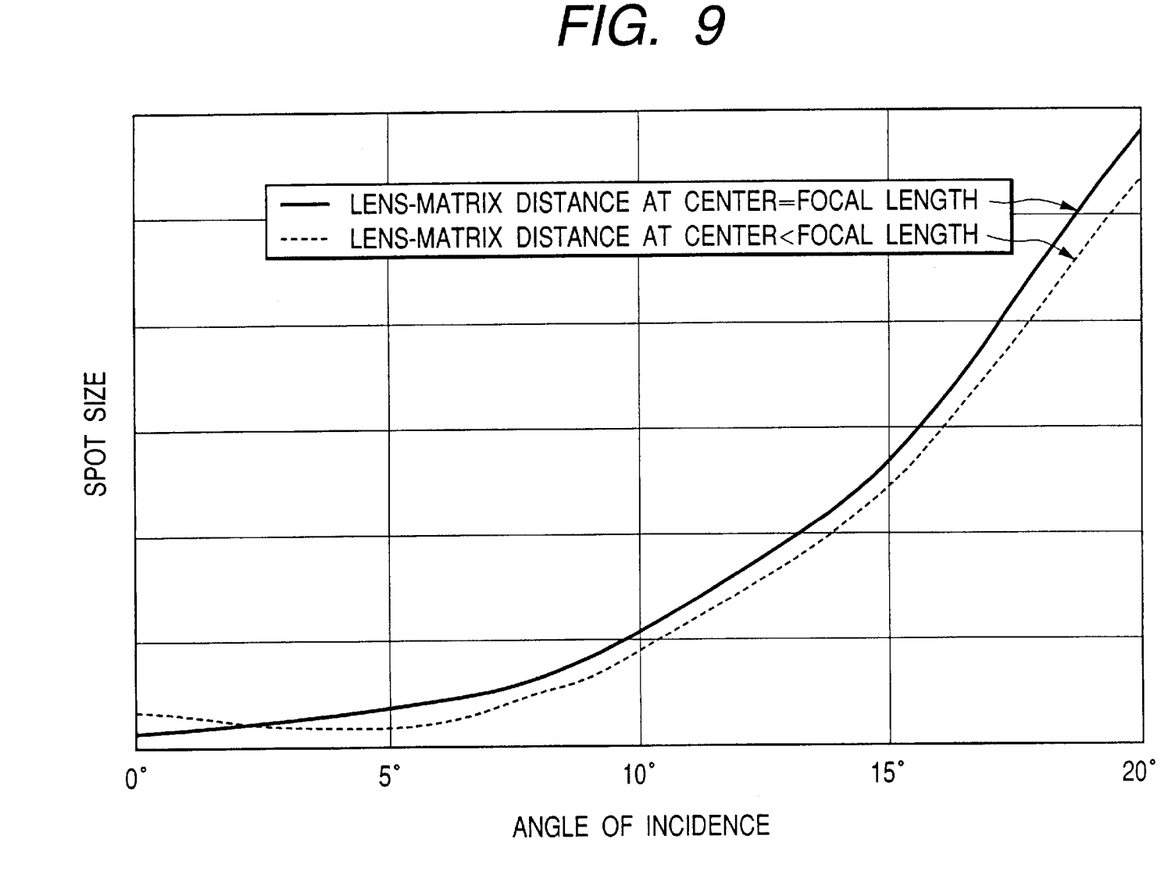
FIG. 9 is a graph which shows the relation between the angle of light incident on a light sensitive unit and the spot size of the light for two cases where the distance between the light-receiving lens and a central portion of the light sensitive unit is equal to the focal length and where it is shorter than the focal length.

(3) In order to minimize optical noises arising from unwanted light traveling from, for example, vehicles running in the opposite lane, it is advisable that only required some of the cells of the light sensitive unit 43 be activated and that the area of the required cells be as small as possible. When the light-receiving lens 41 is, as shown in FIG. 8(a), so located that the focal point thereof may be defined on the center of the light sensitive unit 43, it will cause, as discussed above, the spot of light converged on the light sensitive unit 43, as shown in FIG. 5(b), to increase in size and change in shape into oval as moving from the center to the sides. The difference in size between the spots of light falling on the central area and the side areas of the light sensitive unit 43 may be minimized, as shown in FIG. 8(b), by decreasing the distance between the light-receiving lens 41 and the center of the light sensitive unit 43 below the focal length of the light-receiving lens 41 to decrease the distance between the light-receiving lens 41 and each of the side areas of the light sensitive unit 43 close to the focal length so that the spot of light falling on the central area of the light sensitive unit 43 may become great, while the sport of light falling on the side areas of the light sensitive unit 43 may become small. It is, however, not preferable that the spot of light falling on the central area of the light sensitive unit 43 become greater than that of light falling on the side areas. It is, thus, advisable that the absolute value of a difference between the focal length and the distance between the light-receiving lens 41 and the central area of the light sensitive unit 43 be equal to the absolute value of a difference between the focal length and the distance between the light-receiving lens 41 and the side areas of the light sensitive unit 43. In practice, however, the number of times data on the distance to and the position of a target is obtained based on a signal detected near the center of the light sensitive unit 43 is greater than that based on a signal detected near the sides of the light sensitive unit 43, and the importance of the former data is also higher than that of the latter. The spot of light falling on the central area of the light sensitive unit 43 is, therefore, preferably greater in size than that of light falling on the side areas of the light sensitive unit 43. FIG. 9 shows the relation between the angle of light incident on the light sensitive unit 43 and the spot size of the light for two cases where the distance between the light-receiving lens 41 and the central portion of the light sensitive unit 43 is equal to the focal length and where it is shorter than the focal length. In the latter case, the spot of light falling on the light sensitive unit 43 at an angle of 5° is smallest in size, and the spot of light incident on the light sensitive unit 43 at an angle of 10° is approximately two times greater than that of light incident at an angle 0°.

Figure 10:
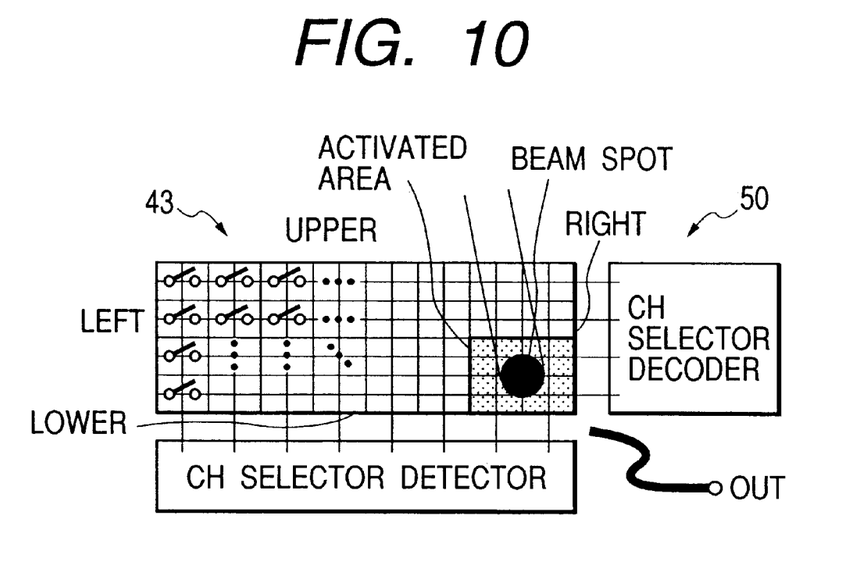
FIG. 10 shows a modification of a cell selecting circuit designed to select light sensitive cells to be activated in units of cell.

FIG. 10 shows a modification of the cell selecting circuit 50 which is different from the one shown in FIG. 2 in that all the cells of the light sensitive unit 43 are activated independently from each other. In the cell selecting circuit 50 shown in FIG. 2, the number of switches used in the vertical cell selector 51 and the horizontal cell selector 42 is no more than the sum of the number of rows and the number of columns of the matrix of cells, while this modification requires as many switches as the cells of the light sensitive unit 43, but it may select any shape of an area of the light sensitive unit 43 covered optically by the activated cells as well as the square, which allows the distance to and the angular position of a target to be determined with higher accuracy.

Figure 11:
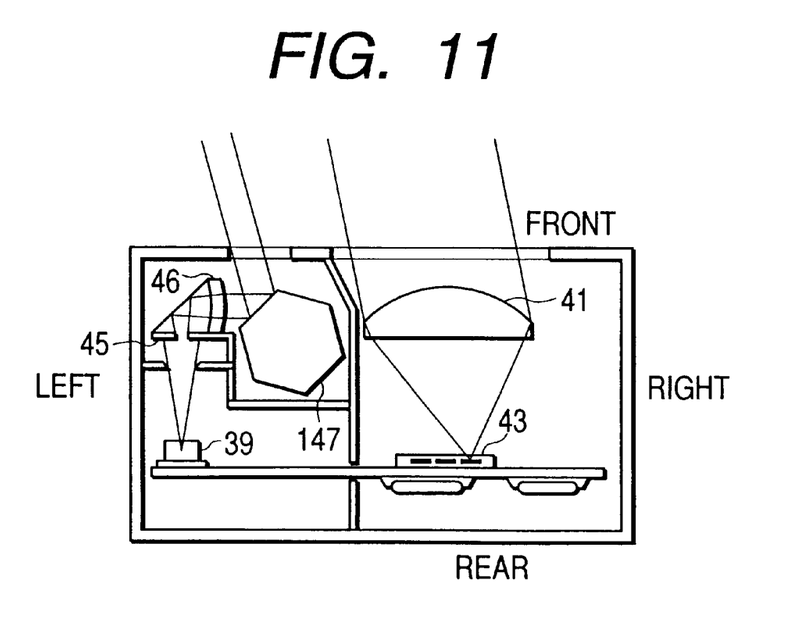
FIG. 11 show a modification of a transceiver using a polygonal mirror for emitting a laser beam.

The mirror 47 of the scan mechanism 35 is a galvano-mirror, but a polygonal mirror 147, as shown in FIG. 11, may be used which consists of, for example, six mirror plates inclined vertically at different angles so that a laser beam radiated from the mirror 147 may also scan the detection zone vertically. The cross section of a laser beam emerging from the transmission lens 46 does not always extend vertically, like the above embodiment. This modification also offers the same effect as that in the above embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A distance measuring apparatus comprising:
  a laser scanner emitting a laser beam to scan a given object detection zone, in a cycle, defined by a first angular range and a second angular range substantially perpendicular to the first angular range, the laser beam having a cross section extending in a first angular direction so as to cover the first angular range of the object detection zone and being moved in a second angular direction so as to scan the second angular range in each scan cycle of the laser beam;
  a light receiving unit receiving a return of the laser beam from a reflective object present in the object detection zone, said light receiving unit including a matrix of light sensitive cells defined by first arrays each of which extends in the second angular direction and which are disposed adjacent to each other in the first angular direction for optically covering the first angular range of the object detection zone and second arrays each of which extends in the first angular direction and which are disposed adjacent each other in the second angular direction for optically covering the second angular range of the object detection zone, each of the light sensitive cells, when activated, converting the return of the laser beam falling thereon into an electric signal;

a time difference determining circuit responsive to the electric signal for said light receiving unit to determine a time difference between emission of the laser beam and reception of the return of the laser beam;

a distance determining circuit determining data on a distance to the reflective object based on the time difference determined by said time difference determining circuit;

a cell activation selector selecting the light sensitive cells of said light receiving unit to be activated, said cell activation selector selectively activating the light sensitive cells of each of the second arrays in each scan cycle of the laser beam and also activating the light sensitive cells of each of the first arrays, in sequence, in the second angular direction in synchronism with scanning of the laser beam over the second angular range of the object detection zone in each scan cycle of the laser beam; and a lens which converges incoming light at a light sensitive surface of said light sensitive unit defined by the matrix of the light sensitive cells, and wherein said cell activation selector selectively activates groups of one or more of the light sensitive cells, the number of light sensitive cells in said groups of light sensitive cells increasing from a central portion toward a peripheral portion of the light sensitive surface so that an area of the light sensitive surface that is optically covered by activated light sensitive cells increases from a central portion toward a peripheral portion of the light sensitive surface with expected increase in spot size of the returning laser beam.

2. A distance measuring apparatus as set forth in claim 1, wherein said cell activation selector selectively activates the light sensitive cells so that the number of the light sensitive cells activated is increased from the central portion toward the peripheral portion of the light sensitive surface of said light receiving unit.

3. A distance measuring apparatus as set forth in claim 1, wherein the distance measuring apparatus is employed in an automotive vehicle, and wherein the first angular direction is a height-wise direction of the vehicle, and the second angular direction is a width-wise direction of the vehicle.

4. A distance measuring apparatus comprising:

a laser scanner emitting a laser beam to scan a given object detection zone, in a cycle, defined by a first angular range and a second angular range substantially perpendicular to the first angular range, the laser beam having a cross section extending in a first angular direction so as to cover the first angular range of the object detection zone and being moved in a second angular direction so as to scan the second angular range in each scan cycle of the laser beam;

a light receiving unit receiving a return of the laser beam from a reflective object present in the object detection zone, said light receiving unit including a matrix of light sensitive cells defined by first arrays each of which extends in the second angular direction and which are disposed adjacent to each other in the first angular direction for optically covering the first angular range of the object detection zone and second arrays each of which extends in the first angular direction and which are disposed adjacent each other in the second angular direction for optically covering the second angular range of the object detection zone, each of the light sensitive cells, when activated, converting the return of the laser beam falling thereon into an electric signal;

a time difference determining circuit responsive to the electric signal for said light receiving unit to determine a time difference between emission of the laser beam and reception of the return of the laser beam;

a distance determining circuit determining data on a distance to the reflective object based on the time difference determined by said time difference determining circuit;

a cell activation selector selecting the light sensitive cells of said light receiving unit to be activated, said cell activation selector selectively activating the light sensitive cells of each of the second arrays in each scan cycle of the laser beam and also activating the light sensitive cells of each of the first arrays, in sequence, in the second angular direction in synchronism with scanning of the laser beam over the second angular range of the object detection zone in each scan cycle of the laser beam; and a lens which converges incoming light at a light sensitive surface of said light sensitive unit defined by the matrix of the light sensitive cells, and wherein the light sensitive cells of said light receiving unit have different individual sizes, which increase from a central portion toward a peripheral portion of the light sensitive surface so that an area of the light sensitive surface that is optically covered by activated light sensitive cells increases from a central portion toward a peripheral portion of the light sensitive surface with expected increase in spot size of the returning laser beam.

5. A distance measuring apparatus as set forth in claim 4, wherein the distance measuring apparatus is employed in an automotive vehicle, and wherein the first angular direction is a height-wise direction of the vehicle, and the second angular direction is a width-wise direction of the vehicle.

* * * * *